(12) United States Patent
Adams

(10) Patent No.: US 6,775,693 B1
(45) Date of Patent: Aug. 10, 2004

(54) NETWORK DMA METHOD

(75) Inventor: Stephen L. Adams, Campbell, CA (US)

(73) Assignee: Baydel Limited, Leatherhead (GB)

( * ) Notice: Subject to any disclaimer, the term of this patent is extended or adjusted under 35 U.S.C. 154(b) by 0 days.

(21) Appl. No.: 09/539,229

(22) Filed: Mar. 30, 2000

(51) Int. Cl.$^7$ ............................................. G06F 13/00
(52) U.S. Cl. ...................................... 709/213; 709/232
(58) Field of Search ................................ 709/213, 200, 709/201, 203, 217, 218, 219, 220, 224, 227, 232

(56) References Cited

U.S. PATENT DOCUMENTS

| | | | | |
|---|---|---|---|---|
| 5,655,090 A | * | 8/1997 | Weingart | 712/25 |
| 6,310,884 B1 | * | 10/2001 | Odenwald, Jr. | 370/412 |
| 6,473,783 B2 | * | 10/2002 | Goshey et al. | 709/203 |
| 6,493,750 B1 | * | 12/2002 | Mathew et al. | 709/220 |
| 6,549,934 B1 | * | 4/2003 | Peterson et al. | 709/203 |
| 6,570,849 B1 | * | 5/2003 | Skemer et al. | 370/230.1 |

FOREIGN PATENT DOCUMENTS

EP 0 657 824 6/1995
WO WO 99/16177 4/1999

* cited by examiner

Primary Examiner—Moustafa M. Meky

(57) ABSTRACT

The invention blends Fiber Channel ("FC") hardware with networking software to produce a network that allows network data to be transferred via direct memory access ("DMA") between two application buffers in computers separated by a network. During boot up, the FC network interface card ("NIC") drivers specify MTUs greater or equal to the segment size to the operating system so that data are not segmented into smaller datagrams during a network data write. During the network write, a first FC NIC sets up the send end of the DMA and sends the network headers of the data to a second FC NIC. The second FC NIC passes the network headers up through the protocol stack. The protocol stack locates and passes the application buffer address to the second FC NIC. The second FC NIC sets up the receive end of the DMA and sends a signal to the first FC NIC to start a buffer-to-buffer DMA transfer of the data. At the end of the buffer-to-buffer DMA transfer, the first FC NIC sends a signal to the second FC NIC indicating the status of the transfer. The first and second FC NICs may treat the entire data transfer as a Small Computer System Interface ("SCSI") disk transaction and use existing SCSI Assist Hardware to reduce the involvement of the host software.

39 Claims, 4 Drawing Sheets

NETWORK DMA METHOD

A portion of the disclosure of this patent document contains material which is subject to copyright protection. The copyright owner has no objection to the facsimile reproduction by anyone of the patent document or the patent disclosure, as it appears in the patent and trademark office patent files or records, but otherwise reserves all copyright rights whatsoever.

FIELD OF INVENTION

This invention is directed to application buffer-to-buffer transfers over a network, and more particularly to DMA transfer over a network between application buffers using Fibre Channel.

BACKGROUND

Fibre Channel is a data transport mechanism that includes hardware and a multi-layer protocol. Fibre Channel is described in "Fibre Channel Physical and Signaling Interface (FC-PH)" (ANSI X3.230-1994) by the American National Standard for Information Systems, which is incorporated by reference in its entirety. Fibre Channel is used today as a communication path between computers and disks. For example, Fibre Channel is used in Storage Area Networks ("SANs"). When Fibre Channel is used as a communication path between computers and disks, the Small Computer System Interface ("SCSI") protocol runs on top of the Fibre Channel protocol so that legacy SCSI drivers can still be used to control the data flow. Since a common use of Fibre Channel protocol is to interpret SCSI commands, Fibre Channel adapter cards often have built-in SCSI Assist Hardware to accelerate this process.

Fibre Channel includes a buffer-to-buffer DMA transfer mechanism. If two computers are connected together with Fibre Channel and the Fibre Channel adapter card in the sending computer is given the address of a sending buffer and the Fibre Channel adapter card in the receiving computer is given the address of a destination buffer, the two adapter cards can transfer data across a Fibre Channel media (e.g., a copper or optical cable) from the sending buffer to the receiving buffer in a single DMA burst. This feature works whether the two nodes are connected point-to-point, through a Fibre Channel hub connecting up to 126 nodes together, or through a series of Fibre Channel switches connecting up to 16 million nodes together. When used to connect computers to disks, the disk hardware serves as one of the computers and the buffer-to-buffer DMA transfer simply moves data between an application buffer in the computer and a buffer in the disk.

The SCSI Assist Hardware in Fibre Channel adapter cards accelerates the common SCSI disk transactions. SCSI Assist Hardware lets the host driver place the SCSI command containing the SCSI disk request into the card hardware and relieves the host computer from being interrupted until the data has been transferred and the response phase of the SCSI operation completes. Thus, SCSI Assist Hardware allows a Fibre Channel adapter card to execute the SCSI command phase, the SCSI data phase, and the SCSI response phase without interrupting the host computer.

Networks today communicate by breaking application data into smaller units, called datagrams. Each datagram is sent across the network as a separate unit. Breaking long messages into smaller network units is done to share the network resource so that a long message does not dominate the bandwidth.

Network applications uses a protocol stack to interface the application to the physical network. FIG. 1 shows the layers of a conventional protocol stack based on the Open System Interconnection ("OSI") Seven Layer Reference Model. FIG. 1 compacts layers 5–7 into a single Application layer for ease of reference in relation to the present disclosure. "Application" in this disclosure refers to any program residing above the transport layer, including software that services network requests for file data, such as the SRV server module in the Windows NT operating system.

The transport layer (e.g., Transmission Control Protocol, or "TCP") provides to an application in a local computer a "virtual circuit" that connects the application to an application in a remote computer even where the remote computer is half way around the world. The transport layer maintains this virtual circuit even though the physical network may frequently lose data.

The transport layer breaks the application data into "segments" that it gives to the network layer. Segments created by the transport layer may be up to 64 Kbytes. Segments which are not acknowledged by the transport layer on the destination computer are resent.

The application data given to the transport layer may have its own application header A (FIG. 1) describing the data. File transfers under Windows NT® ("NT") for example, have a Server Message Block ("SMB") header placed before the data. The application may divide the data into units smaller than 64 Kbytes. The file server software SRV that handles remote requests for files in NT, for example, breaks data into units of about 60 Kbytes. The transport layer adds its own header T (FIG. 1) and passes the segment down to the network layer.

The transport process that creates a virtual circuit requires an acknowledge signal ("ACK") back from the final destination for the data sent. If a specified number of ACKs is not received, the transport layer on the sending side stops sending data. If the missing ACKs are not received in a predetermined time, the data is resent. The transport layer, thus, implements both a flow-control mechanism and an error-control mechanism.

The network layer (e.g., Internet Protocol, or "IP") breaks the transport segment into datagrams that will fit in the Maximum Transfer Unit (MTU) of the network, which is 1500 bytes for an Ethernet physical layer. The network layer then attempts to move each of these MTU-size datagrams through the network to the destination. The network layer gives each of these 1500-byte datagrams a network header N (FIG. 1) containing the address of the final destination node. The network layer also adds a Media Access ("MAC") address to each datagram before passing it down to the data link layer. The MAC address is the physical address of the very next node in the network path. As the datagram makes its way through the network toward its final destination, the MAC address is replaced at each hop with the address of the next node on the route.

The data link layer instructs the network interface card ("NIC") to move the datagram fragment over the physical network to the next node. The data link layer includes the NIC drivers. As FIG. 1 shows, as the application data moves down the protocol stack, it accumulates headers 10. At the data link layer, the first few hundred bytes of the final datagram contain all of headers 10.

The description above for the transport, network, and data link layers applies equally to a Wide Area Network (WAN) that could span the entire globe and pass through numerous routers, as to a local area network (LAN) where the nodes may all be in the same building. In a LAN, each node is often just one hop away. That is, the MAC address also points to the final destination.

In a conventional network, a read operation can be seen as a write of the read request by a client computer to a server, followed by a write back of the data by the server to the client computer. For example, when a client computer wants to read data from a remote server, the client computer writes a request to the server asking for certain file data. The network is then quiescent with no state maintained about the read operation. When the server locates the data, it writes the data back to the client computer.

In the write back operation, the transport layer sets up a virtual circuit to the application in the destination computer, or uses a virtual circuit that already exists to this application, and passes a segment of data to the network layer. For example, if the application is a remote NT file server, the software in the NT server is SRV. After receiving the request for file data, the server locates and returns the data. The application source buffer in this case is most likely the cache in the NT server. If the data is already in cache, the cache serves the data directly. If the data is not in the cache, NT reads the data into cache before satisfying the network request.

As discussed above, the network layer fragments the segment into MTU-size datagrams which are passed to the data link layer. Since each datagram is a separate entity that may take a different route through the network, the datagrams could arrive at the destination in a different order than they were sent. Because of the possibility of receiving datagrams out of order, the receiving layers below the transport layer in the destination computer buffer and reorder the datagram fragments, if necessary, before passing them to the upper layers. While the chance of datagrams arriving out of order is small on a LAN, LAN datagrams are processed the same way as WAN datagrams.

Another reason buffering is required at the receiver is that the datagrams in a conventional network are unsolicited, i.e. the receiving network hardware does not know yet the final destinations for the data in the datagrams. The receiving node puts the unsolicited datagrams into a temporary buffer until the final application buffer is found, at which time the data is copied from the temporary buffer to the application buffer. Thus, the receiver buffering moves the data received twice.

Because of the unreliable physical network, the transport layer uses a "checksum" in one of the fields of the transport header T (FIG. 1). The checksum is recalculated at the receiving end as the data arrives and compared with the checksum sent. Computing checksum is a large network overhead.

On the receiving side, there are two conventional ways to handle arriving datagrams. The first puts each datagram into a temporary buffer reserved for unsolicited transmissions, reorders the datagrams as necessary, and passes them up to the protocol stack where they are copied to the application buffer. Alternatively, the first datagram received is passed up while succeeding datagrams are placed in temporary buffers. This first datagram contains headers 10, so the upper layers can locate the designated application. The application then passes down an application buffer address and the data link layer begins copying the buffered data to this address, reordering datagrams as necessary. In both cases above, the arriving data is first put into a temporary buffer and later copied to the application buffer.

SUMMARY

In one embodiment, a method for transferring data over a network includes specifying a Maximum Transfer Unit ("MTU") greater or equal to the segment size, sending the network headers of an application data over the network, receiving a start-transfer signal indicating that the destination application buffer is ready to receive application data over the network, and sending the application data from the first application buffer to the second application buffer over the network. In one implementation, the network includes a Fibre Channel network. In another implementation, the network includes any network media that allows buffer-to-buffer direct memory access ("DMA") transfers of data. In yet another implementation, the sending of the network headers, the receiving of the start-transfer signal, the sending of the application data, and the receiving of the transfer status are accomplished using a single hardware SCSI exchange.

BRIEF DESCRIPTION OF THE DRAWINGS

The use of the same reference symbols in different drawings indicates similar or identical items.

DETAILED DESCRIPTION

Figure 2A:
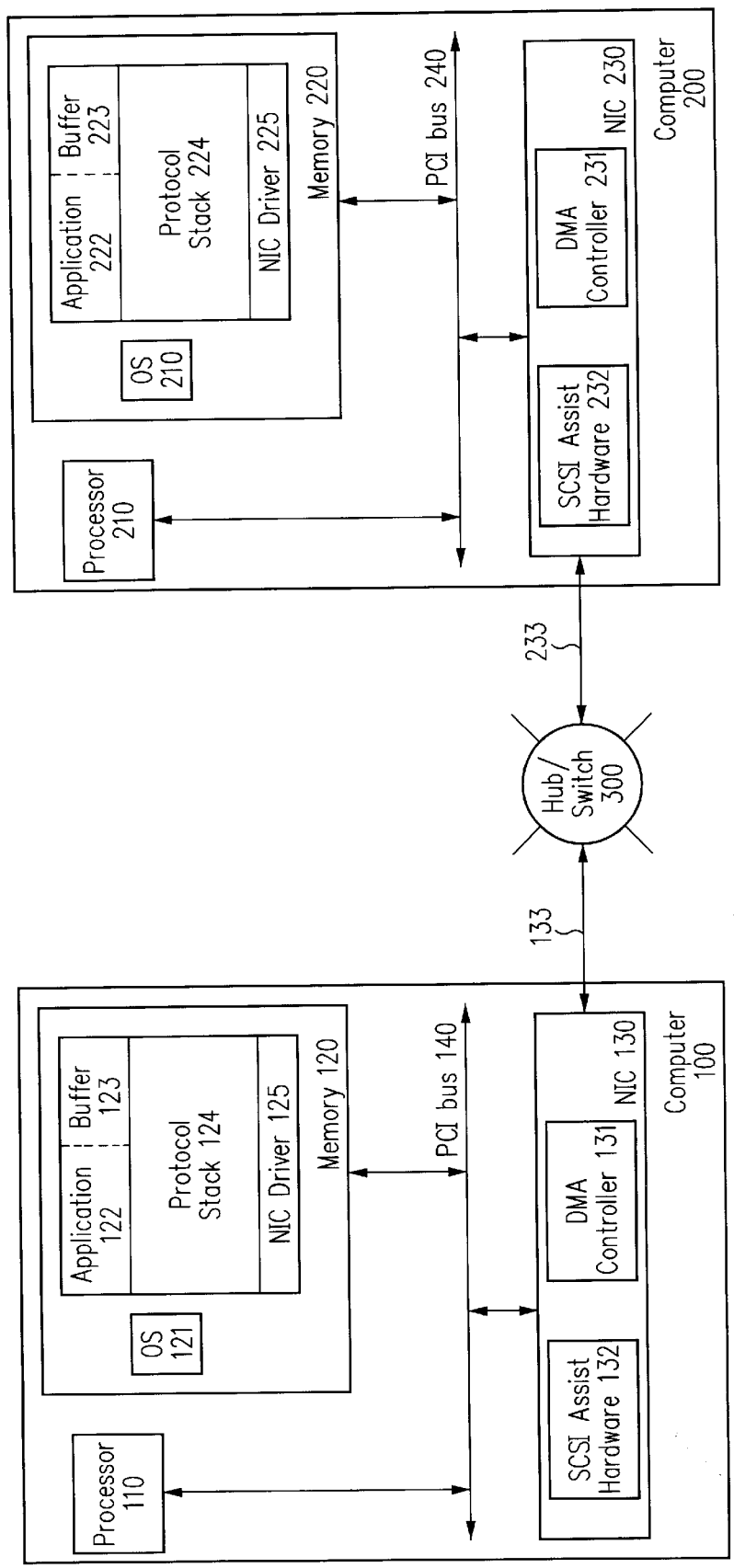
FIG. 2A illustrates a network in accordance with one embodiment of the present invention.

FIG. 2A illustrates a network for transferring data between application buffers 123 and 223 of computers 100 and 200. Computer 100 includes processor 110, memory 120, and network interface card ("NIC") 130 all coupled to peripheral component interconnect ("PCI") bus 140. Computer 100 is, for example, a client computer such as a "white box" computer using an ASUS P2B mother board with 400 MHz Pentium II processor. Memory 120 includes an operating system ("OS") 121, application 122, application buffer 123, a protocol stack 124, and NIC driver 125. OS 121 is, for example, Windows NT® Workstation from Microsoft® Corporation of Redmond, Wash. NIC 130 includes direct memory access controller ("DMA") 131 and Small Computer System Interface ("SCSI") Assist Hardware 132. NIC 130 is coupled to Fibre Channel cable 133. NIC 130 is, for example, an HHBA-5100A Tachyon TL Fibre Channel Adapter Card available from Agilent Technologies Inc. of Palo Alto, Calif. Cable 133 is, for example, standard 62.5 micron multi-mode fiber optic cable used commonly with Gigabit Ethernet and Fibre Channel.

Computer 200 includes processor 210, memory 220, and network interface card ("NIC") 230 all coupled to peripheral component interconnect ("PCI") bus 240. Computer 200 is, for example, a server computer such as a Dell 6300 PowerEdge. Memory 220 includes operating system ("OS") 221, application 222, application buffer 223, protocol stack 224, and NIC driver 225. OS 221 is, for example, Windows NT® Server from Microsoft® Corporation of Redmond, Wash. NIC 230 includes direct memory access controller ("DMA") 231 and Small Computer System Interface ("SCSI") Assist Hardware 232. NIC 230 is coupled to a Fibre Channel media 233. NIC 230 is, for example, an HHBA-5100A Tachyon TL Fibre Channel Adapter Card available from Agilent Technologies Inc. of Palo Alto, Calif. Media 233 is for example, standard 62.5 micron multi-mode fiber optic cable used commonly with Gigabit Ethernet and Fibre Channel.

Hub or switch 300 couples cables 133 and 233. Hub/switch 300 is, for example, an LH5000 Digital Fibre Hub from Emulex of Costa Mesa, Calif.

Figure 2B:
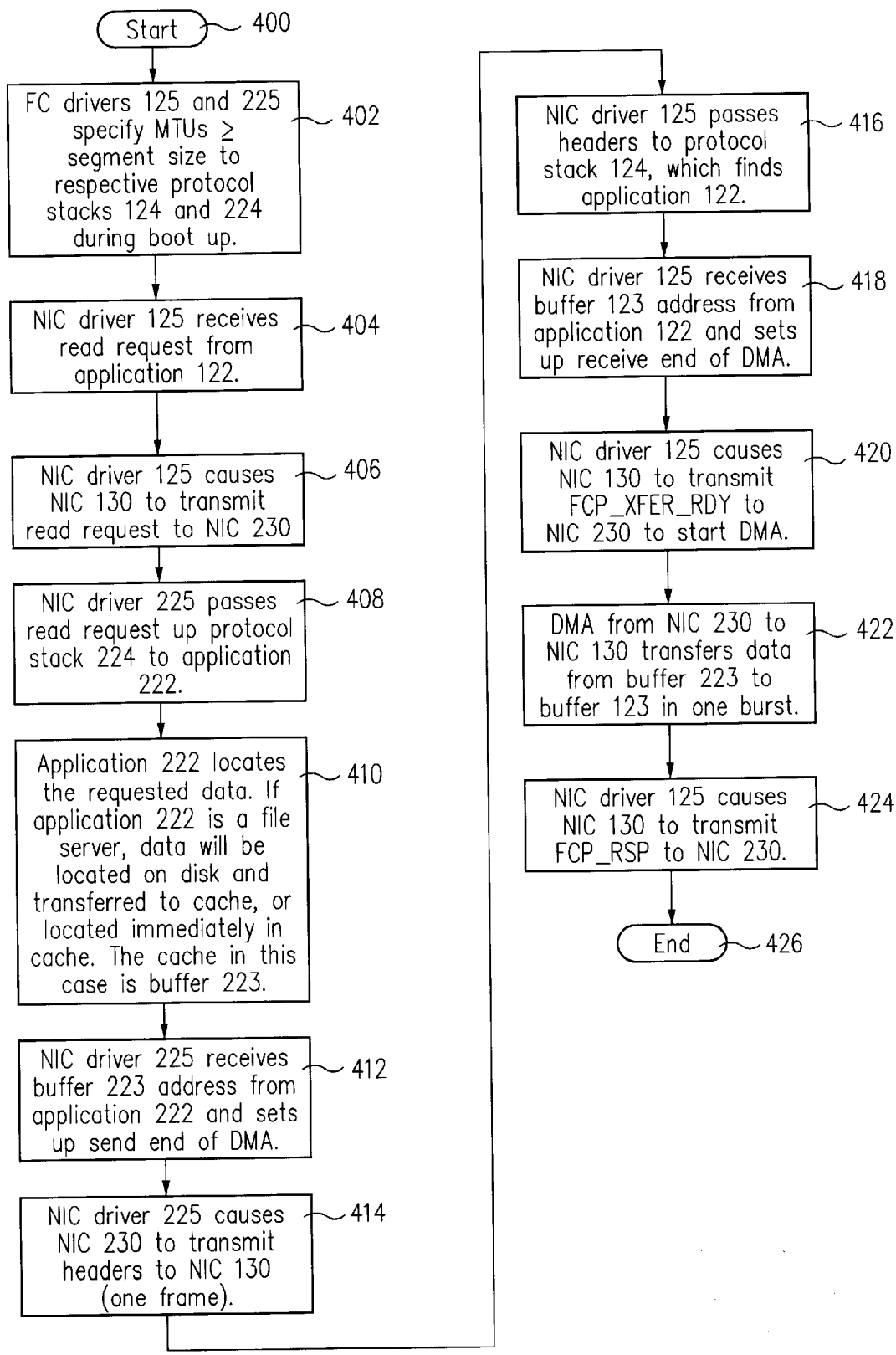
FIG. 2B illustrates a method for buffer-to-buffer transfer over the network of FIG. 2A in accordance with one embodiment of the present invention.

FIG. 2B illustrates a method 40 for transferring data between application buffer 123 of computer 100 and application buffer 223 of computer 200. Method 40 starts in action 400. Action 400 is followed by action 402. In action 402, NIC drivers 125 and 225 specify a maximum transfer unit ("MTU") greater or equal to the segment size to protocol stacks 124 and 224, respectively, during boot up.

Several bottlenecks in the conventional network transfer described earlier are removed when NIC drivers 125 and 225 specify MTU greater than the segment size. For example, Ethernet requires the network layer in the protocol stack to fragment each 64 Kbyte segment into 40 or more small datagrams because Ethernet has an MTU of 1500 bytes. NIC drivers 125 and 225 overcome this fragmentation by specifying an MTU during system boot up that is large enough for an entire segment. While Ethernet cannot accommodate an MTU this large, Fibre Channel can. All of the segment data from the transport layer of protocol stack 124 and 224 are therefore submitted directly to respective NIC drivers 125 and 225. NIC drivers 125 and 225 can thereafter transfer the complete segment in one DMA burst using buffer-to-buffer mechanisms (described later) in respective NICs 130 and 230. Furthermore, the data received does not need to be saved in a temporary buffer for possible reordering as the Fibre Channel hardware guarantees in-order delivery of the DMA burst.

In one implementation, NICs 130 and 230 use a Fibre Channel frame of 2112 bytes. However, this frame size limitation is not visible outside of NICs 130 and 230. Thus, the MTU specified by NIC drivers 125 and 255 during boot up is not limited by the Fibre Channel frame size. Action 402 is followed by action 404.

In action 404, NIC driver 125 receives a read request from application 122 through protocol stack 124. The read request is a request for data stored in computer 200. Action 404 is followed by action 406. In action 406, NIC driver 125 causes NIC 130 to transmit the read request to NIC 230. In one implementation, the read request is a server message block ("SMB") read request and NIC 130 transmits the SMB read request as a Fibre Channel single frame sequence (SFS) to NIC 230. In one variation, NIC 130 transmits the read request to NIC 230 over cable 133 and cable 233 through hub/switch 300. Action 406 is followed by action 408.

In action 408, NIC driver 225 receives the read request from NIC driver 230 and passes the read request to application 222 through protocol stack 224. Action 408 is followed by action 410. In action 410, application 222 locates the requested data. The requested data may be located on a hard disk or in application buffer 223 (also known as "cache") in memory 220. Action 410 is followed by action 412.

Figure 1:
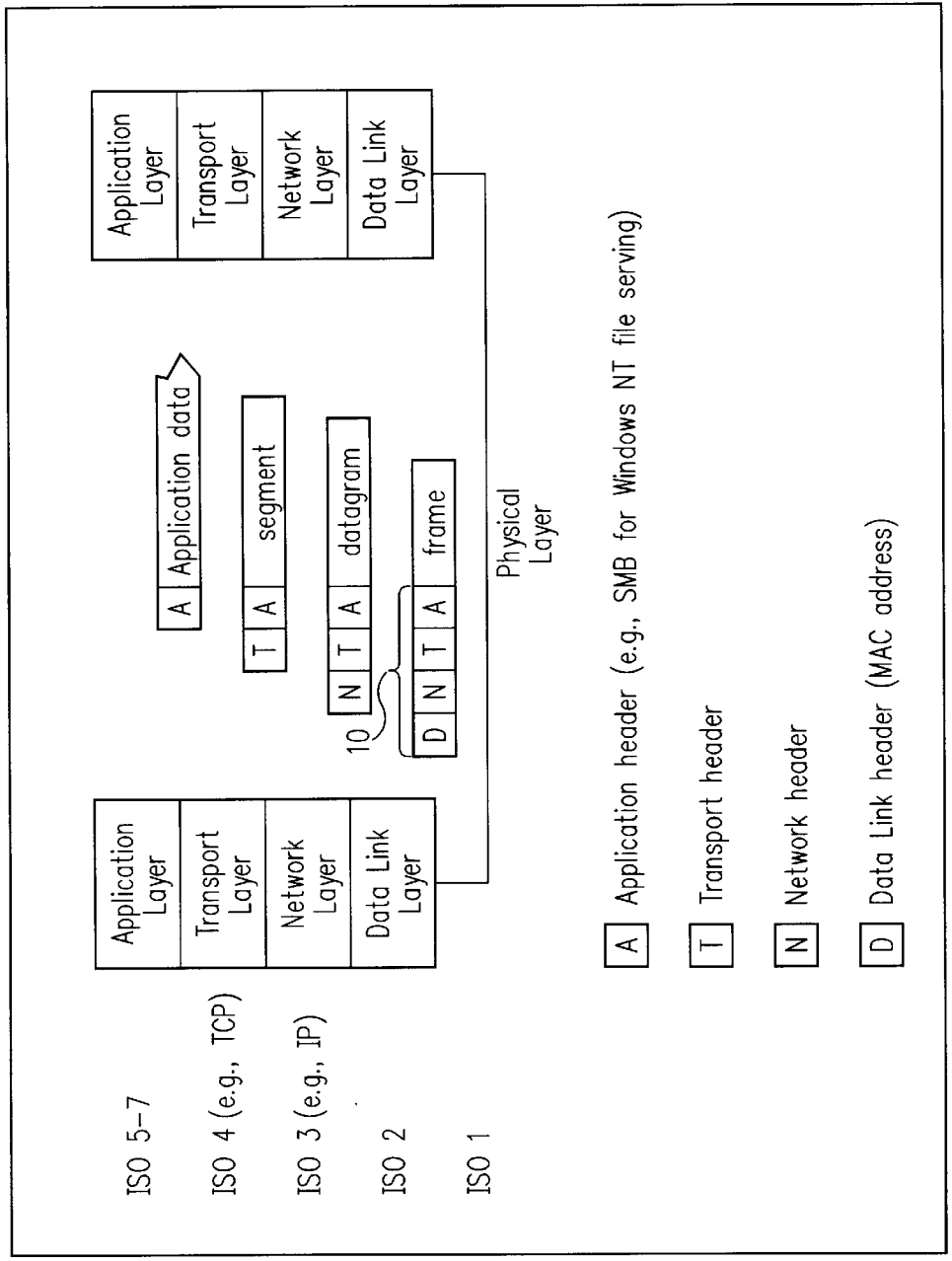
FIG. 1 illustrates the OSI Seven Layer Reference Model.

In action 412, NIC driver 225 receives the buffer address (e.g., address of application buffer 223) of the requested data from application 222 through protocol stack 224 and sets up NIC 230 (more specifically, DMA controller 231) as the transmitting end of a DMA transfer between application buffer 223 in computer 200 and some buffer, as yet unknown, in computer 100. Action 412 is followed by action 414. In action 414, NIC driver 225 causes NIC 230 to transmit headers 10 (FIG. 1) of the requested data to NIC 130. In one implementation, NIC 230 transmits headers 10 to NIC 130 as a SCSI command ("FCP_CMND") in a Fibre Channel SFS. This allows NIC 230 to use SCSI Assist Hardware 232 for the pending DMA data transfer without invoking host software.

Contrary to a conventional network discussed earlier, NIC driver 225 does not continue sending requested data after sending the headers. Instead, NIC driver 225 sets up the sending end of a DMA transfer from the application buffer address received, sends one frame of a couple of hundred bytes containing all of headers 10 (FIG. 1), and then waits for NIC driver 125 to obtain the destination application buffer address from headers 10 and set up the receiving end of the DMA transfer. Thus, other than the headers, NIC driver 225 does not transmit unsolicited data (data without destination buffer address) to computer 100 and cause computer 100 to store the requested data in buffers reserved for unsolicited data and later copy the data to the appropriate application buffer. Action 414 is followed by action 416.

In action 416, NIC driver 125 receives headers 10 from NIC 130 and passes headers 10 to the upper layers of protocol stack 124. NIC driver 125 indicates to protocol stack 124 that there is more data to follow. This action causes protocol stack 124 to return the address of the application buffer 123 to NIC driver 125. Protocol stack 124 believes that the requested data has already been received in memory 120's unsolicited buffers (as in a conventional network described above) and proceeds to locate the application associated with headers 10 (e.g., application 122) and return the associated buffer address.

In one implementation, when NIC driver 125 receives headers 10 in an unsolicited Fibre Channel frame from NIC 130, NIC driver 125 looks at two fields in a special structure appended to the data. These fields are "LookaheadSize" and "TotalPacketSize." LookaheadSize is the amount of data in this frame. TotalPacketSize is the total amount of data in the packet including any data still sitting in application buffer 223 of computer 200. If these two fields are equal, NIC driver 125 knows that computer 200 has sent the entire message. In this case, if the OS is NT, NIC driver 125 passes the packet up to protocol stack 124 by calling "NdisMEthlndicateReceive" (described below) with "LookaheadBufferSize=PacketSize." This tells protocol stack 124 that the entire packet is being indicated up at this time.

NdisMEthlndicateReceive(
   MiniportAdapterHandle,
   MiniportReceiveContext,
   HeaderBuffer,
   HeaderBufferSize,
   LookaheadBuffer,
   LookaheadBufferSize,
   PacketSize
);

Thus, small packets (e.g., read requests) are sent between computer 100 and computer 200 without buffer-to-buffer transfers. "Small" is defined by NIC driver 125 as a length too small to justify the overhead of setting up a buffer-to-buffer transfer, e.g., 1024 bytes.

If LookaheadSize is less than TotalPacketSize in the special structure appended to the data, NIC driver 125 calls NdisMEthlndicateReceive with "LookaheadBufferSize<PacketSize." Protocol stack 124 then finds the designated application (e.g., application 122) and obtains a buffer address for the remainder of the data. If the OS is NT, protocol stack 124 passes this address back down to NIC driver 125 by calling MiniportTransferData:

```
MiniportTransferData(
  Packet,
  BytesTransferred,
  MiniportAdapterContext,
  MiniportReceiveContext,
  ByteOffset,
  BytesToTransfer
);
```

The "Packet" parameter in the MiniportTransferData call contains pointers to the destination buffer (e.g., address of application buffer 123) for the data. Action 416 is followed by action 418.

In action 418, NIC driver 125 receives the address of application buffer 123 from application 122 through protocol stack 124 and sets up NIC 130 (more specifically DMA controller 131) as the receiving end of a DMA transfer between computers 100 and 200. Action 418 is followed by action 420. In action 420, NIC driver 125 causes NIC 130 to transmit a start-transfer signal to NIC 230 to start the DMA transfer. In one implementation, NIC 130 transmits the start-transfer signal as a SCSI "FCP_XFER_RDY" in a Fibre Channel SFS to NIC 230. This allows NIC 230 to use SCSI Assist Hardware 232 for the pending DMA data transfer without invoking host software.

Action 420 is followed by action 422. In action 422, DMA controllers 231 and 131 transfer the requested data from application buffer 223 to application buffer 123 in a single DMA burst. DMA controllers 231 and 131 move the requested data from application buffer 223 to application buffer 123 with no intermediate copies and very little processor overhead. In one implementation, the DMA transfer accrues little processor overhead from processors 110 and 210 because NIC drivers 125 and 225 configure the transport layers in respective protocol stacks 124 and 224 to forego conventional checksums. Instead, NICs 130 and 230 rely on the internal Fibre Channel hardware already performing a data integrity check. For example, each 2112 byte Fibre Channel frame includes a 32-bit cyclical redundancy check ("CRC") that detects all one and two bit errors in the frame and most other errors, including all errors over an odd number of bits. Action 420 is followed by action 424.

In action 424, NIC driver 125 causes NIC 130 to transmit a status signal to NIC 230 to acknowledge that the requested data has been received. In one implementation, NIC 130 transmits the status signal as SCSI "FCP_RSP" in a Fibre Channel SFS to NIC 230. The status signal causes NIC 230 to drop out of its SCSI Assist Hardware mode and inform NIC driver 225 that the transfer is complete. Action 424 is followed by action 426, which ends method 40.

As described above, method 40 does not change the programming interface seen by applications accessing the network. Thus, application programs in the network computers using this invention see only the conventional programming interface. Since method 40 does not change this interface, method 40 operates identically to legacy networks and transparently to existing applications (except that method 40 provides significantly faster data transfer than conventional networks).

Figure 3:
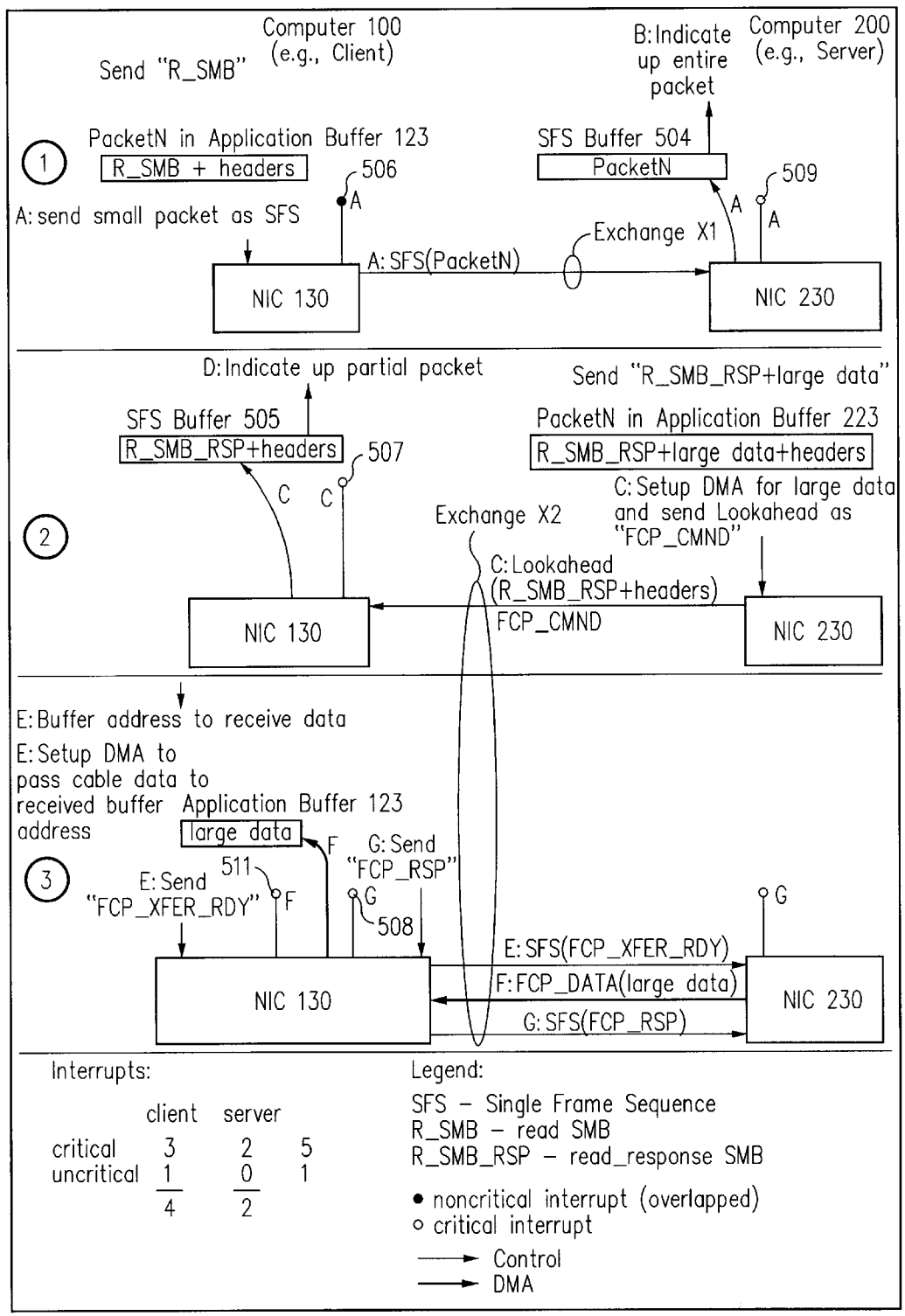
FIG. 3 illustrates a data read process of the method in FIG. 2B.

FIG. 3 shows a data read between computers 100 (e.g., client) and 200 (e.g., server) from the viewpoint of NICs 130 and 230. In phase 1, NIC 130 sends the SMB read request to NIC 230. In phase 2, NIC 230 sets up the send end of the DMA and sends the first couple of hundred bytes of the SMB read response. NIC 130 gets the destination address from its application and writes it into DMA controller 131. In phase 3, DMA controllers 131 and 231 send the data by DMA from application buffer 223 to application buffer 123. The phases in FIG. 3 include one or more lettered actions A, B, C, D, E, F, and G, which are now explained in further detail.

In phase 1, action A, NIC 130 sends the SMB Read request (e.g., "R_SMB") to NIC 230 in a Fibre Channel SFS. The request goes across the network and is put into an SFS Buffer 504 reserved at computer 200 for unsolicited arriving frames. NIC 130 sends an interrupt 506 to NIC driver 125 to indicate that the SFS (e.g., "R_SMB") has been sent successfully. NIC 230 sends an interrupt 509 to indicate to NIC driver 225 the arrival of the unsolicited SFS.

In phase 1, action B, NIC 230 passes the SMB read request up to protocol stack 224 to application 222. Application 222 is, for example, an NT server module SRV. At the completion of action B, there is no state information remaining in the network regarding the read operation. The read response that comes back from computer 200 with the data is a completely independent network event.

In phase 2, action C, NIC 230 receives an SMB read response (e.g., "R_SMB_RSP+large data") from protocol stack 224. The SMB read response includes the SMB information and pointers to the requested data. NIC 230 sets up to send by DMA the requested data onto media 233 to computer 100. NIC 230 sends headers 10, which includes the SMB read response header (A in FIG. 1) as a SCSI command ("FCP_CMND") in a Fibre Channel SFS to NIC 130. This "Lookahead information" goes across the network and is put into an SFS Buffer 505 reserved at computer 100 for unsolicited arriving frames. Treating the Lookahead information as a SCSI command allows NIC 230 to invoke SCSI Assist Hardware 232, which avoids host interrupts for the pending DMA transfer. NIC 130 sends an interrupt 507 to NIC driver 125 to indicate the arrival of an unsolicited SFS (e.g., "FCP_CMND").

In phase 2, action D, NIC 130 passes headers 10 up to protocol stack 124 with an indication that more data is available (e.g., this is a partial packet where LookaheadBufferSize<PacketSize).

In phase 3, action E, protocol stack 124 has processed headers 10 (e.g., the partial packet) that was passed up and returns the address of the application buffer (e.g., application buffer 123) to receive the requested data. NIC 130 sets up a DMA from media 133 to this buffer (e.g., application buffer 123). NIC 130 sends a SCSI signal ("FCP_XFER_RDY") in a Fibre Channel SFS to the waiting NIC 230 to start the DMA transfer.

In phase 3, action F, NIC 130 and NIC 230 DMA the requested data from application buffer 223 (FIG. 1; e.g., NT cache) to application buffer 123 in a single burst as a SCSI data transfer ("FCP DATA"). NIC 130 then sends an interrupt 511 to NIC driver 125 to indicate the end of the DMA transfer.

In phase 3, action G, NIC 130 sends a SCSI signal (e.g., "FCP_RSP") to NIC 230 to return status for the buffer-to-buffer DMA transfer. NIC 130 sends an interrupt 508 to NIC driver 125 to indicate that the SCSI signal (e.g., "FCP_RSP") has been successfully sent. NIC 230 sends an interrupt 510 to NIC driver 225 to indicate that it received a SCSI signal (e.g., "FCP_RSP") from NIC 130, indicating the DMA completed.

Although the present disclosure describes the use of Fibre Channel technology as the network media, one skilled in the art recognizes that the disclosed methods could benefit any network media, including Ethernet. Specifically, any network media can benefit from (1) specifying an MTU during boot up greater than or equal to the segment size to avoid fragmentation of the data by the protocol stack, (2) prefetching the destination address on the computer receiving the data by sending over just the network headers while the data to send remains on the sending computer, and (3) sending data from the sending computer directly to this destination address (instead of to an intermediate buffer in the receiving computer) thereby avoiding repeatedly copying the data. If the network media supports a buffer-to-buffer DMA transfer, sending the data in the above step 3 reduces to a single DMA burst.

Appendices A, B, and C contain source code in C language for one implementation of a NIC driver. Appendix A contains header files used by the instructions in Appendices B and C. The NIC driver comprises two layers. Appendix B contains a first layer that interfaces up to the Microsoft NT Miniport layer at the bottom of the protocol stack and down to a second layer. Appendix C. contains the second layer that interfaces up to the first layer and down to the NIC hardware.

Numerous modifications and adaptations of the embodiments described herein will be apparent to the skilled artisan in view of the disclosure. For example, method 40 is not platform specific and can work on other platforms such as Linux, other forms of the Unix operating system, Apple operating systems, or any other operating system that allows, or can be modified to allow, the passing up of the headers and the passing down of the buffer address of the application. As previously discussed, although Fibre Channel may be used as the network media, other network media may be used and benefit from method 40. Such changes and modifications are encompassed by the attached claims.

I claim:

1. A method for transferring data over a network, comprising the acts of:
    specifying an MTU greater than or equal to the segment size of a first computer;
    sending, by the first computer to a second computer over the network, headers of a data located in a first application buffer in the first computer;
    receiving, by the first computer from the second computer over the network, a start-transfer signal indicating that the second computer is ready to receive the data in a second application buffer in the second computer; and
    sending, by the first computer to the second computer over the network, the data from the first application buffer to the second application buffer.

2. The method of claim 1, wherein the network comprises a Fibre Channel network.

3. The method of claim 1, wherein the network comprises network hardware that allows buffer-to-buffer DMA transfer of data.

4. The method of claim 1, wherein said sending of the data comprises a buffer-to-buffer DMA transfer between the first application buffer and the second application buffer without intermediate copies.

5. The method of claim 1, wherein the sending of the headers comprises transmitting the headers as a SCSI command of FCP_CMND.

6. The method of claim 1, wherein the receiving of the start-transfer signal comprises accepting the start-transfer signal as a SCSI signal of FCP_XFER_RDY.

7. The method of claim 6, further comprising utilizing a SCSI assist hardware of a network interface card in the first computer to process the start-transfer signal without involving a host processor of the first computer.

8. The method of claim 1, wherein said sending of the data comprises transmitting the data as a SCSI data.

9. The method of claim 1, further comprising receiving, by the first computer from the second computer over the network, a status signal indicating the data has been received.

10. The method of claim 9, wherein said receiving the status signal comprises receiving the status signal as a SCSI signal of FCP_RSP.

11. A method for data transfer over a network, comprising the acts of:
    receiving headers for a data from a first computer over the network;
    sending the headers up a protocol stack of a second computer;
    indicating to the protocol stack that more data is to follow;
    receiving an application buffer address for storing the data; and
    sending a start-transfer signal for transmission of the data to the first computer over the network.

12. The method of claim 11, wherein the network comprises a Fibre Channel network.

13. The method of claim 11, wherein the network comprises network hardware that allows buffer-to-buffer DMA transfer of data.

14. The method of claim 11, further comprising the act of receiving the data in a buffer-to-buffer DMA transfer between a first application buffer in the first computer and a second application buffer in the second computer without intermediate copies, the second application buffer corresponding to the application buffer address.

15. The method of claim 11, wherein said receiving the headers comprises accepting the headers as a SCSI command of FCP_CMND.

16. The method of claim 11, wherein said sending the start-transfer signal comprises transmitting start-transfer signal as a SCSI signal of FCP_XFER_RDY.

17. The method of claim 11, further comprising receiving the data by the second computer from the first computer over the network.

18. The method of claim 17, wherein said receiving the data comprises accepting the data as a SCSI data.

19. The method of claim 17, further comprising sending a status signal to the first computer indicating receiving the data by the second computer over the network.

20. The method of claim 19, wherein said sending the status signal comprises transmitting the status signal as a SCSI signal of FCP_RSP.

21. A computer read computer-readable medium carrying a program for data transfer comprising:
    a first instruction to specify an MTU greater than or equal to the segment size of a first computer;
    a second instruction to send, by the first computer to a second computer over the network, headers of a data located in a first application buffer in the first computer;
    a third instruction to set up a hardware of the first computer to receive from the second computer over the network a start-transfer signal indicating that the second computer is ready to receive the data in a second application buffer in the second computer; and
    a fourth instruction to send, by the first computer to the second computer over the network, the data from the first application buffer to the second application buffer.

22. The medium of claim 21, wherein the network comprises a Fibre Channel network.

23. The medium of claim 21, wherein the network comprises network hardware that allows buffer-to-buffer DMA transfer of data.

24. The medium of claim 21, wherein the hardware is a SCSI assist hardware.

25. The medium of claim 21, wherein the second instruction comprises a fifth instruction to transmit the headers as a SCSI command of FCP_CMND.

26. The medium of claim 21, further comprising a fifth instruction to utilize a SCSI assist hardware of a network interface card in the first computer to process the start-transfer signal without involving a host processor of the first computer.

27. The medium of claim 21, wherein the fourth instruction comprises a fifth instruction to transmit the data as a SCSI data.

28. The medium of claim 21, further comprising a fifth instruction to receive, by the first computer from the second computer over the network, a status signal indicating the data has been received.

29. The medium of claim 28, wherein the fifth instruction comprises a sixth instruction to receive the status signal as a SCSI signal of FCP_RSP.

30. A computer-readable medium carrying a program for transferring data comprising:
- a first instruction to receive headers for a data from a first computer over the network;
- a second instruction to send the headers up a protocol stack of a second computer;
- a third instruction to indicate to the protocol stack that more data is to follow;
- a fourth instruction to receive an application buffer address for storing the data; and
- a fifth instruction to send a start-transfer signal for transmission of the data to the first computer over the network.

31. The medium of claim 30, wherein the network comprises a Fibre Channel network.

32. The medium of claim 30, wherein the network comprises network hardware that allows buffer-to-buffer DMA transfer of data.

33. The medium of claim 30, further comprising a sixth instruction to receive the data in a buffer-to-buffer DMA transfer between a first application buffer in the first computer and a second application buffer in the second computer without intermediate copies, the second application buffer corresponding to the application buffer address.

34. The medium of claim 30, wherein the first instruction comprises a sixth instruction to accept the headers as a SCSI command of FCP_CMND.

35. The medium of claim 30, wherein the fifth instruction comprises a sixth instruction to transmit the start-transfer signal as a SCSI command of FCP_XFER_RDY.

36. The medium of claim 30, further comprising a sixth instruction to receive the data by the second computer from the first computer over the network.

37. The medium of claim 36, wherein the sixth instruction comprises a seventh instruction to accept the data as a SCSI data.

38. The medium of claim 36, further comprising a seventh instruction to send a status signal to the first computer indicating receiving the data by the second computer over the network.

39. The medium of claim 38, wherein the seventh instruction comprises an eighth instruction to transmit the status signal as a SCSI signal of FCP_RSP.

\* \* \* \* \*